(12) United States Patent
Layne et al.

(10) Patent No.: US 11,441,647 B2
(45) Date of Patent: Sep. 13, 2022

(54) SYSTEMS AND METHODS FOR A LINEAR ACTUATOR

(71) Applicant: HUSCO AUTOMOTIVE HOLDINGS LLC, Waukesha, WI (US)

(72) Inventors: Michael Layne, Waterford, WI (US);
Dean Wardle, Waukesha, WI (US);
Selena Boltik, Wauwatosa, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 300 days.

(21) Appl. No.: 16/752,789

(22) Filed: Jan. 27, 2020

(65) Prior Publication Data

US 2020/0240495 A1    Jul. 30, 2020

Related U.S. Application Data

(60) Provisional application No. 62/797,705, filed on Jan. 28, 2019.

(51) Int. Cl.
*F16H 25/20* (2006.01)
*H02K 11/215* (2016.01)
*H02K 7/06* (2006.01)

(52) U.S. Cl.
CPC ............ *F16H 25/20* (2013.01); *H02K 7/06* (2013.01); *H02K 11/215* (2016.01); *F16H 2025/204* (2013.01); *F16H 2025/2031* (2013.01); *F16H 2025/2075* (2013.01); *H02K 2211/03* (2013.01)

(58) Field of Classification Search
CPC ............ F16H 25/20; F16H 2025/2075; F16H 2025/204; F16H 2025/2031; H02K 11/215; H02K 7/06
See application file for complete search history.

(56) References Cited

U.S. PATENT DOCUMENTS

| | | |
|---|---|---|
| 3,793,896 A | 2/1974 | Price et al. |
| 6,314,518 B1 | 11/2001 | Linnartz et al. |
| 6,603,229 B1 | 8/2003 | Toye, IV |
| 6,806,597 B2 | 10/2004 | Kondo |
| 2004/0007923 A1 | 1/2004 | Tesar |
| 2012/0160043 A1 | 6/2012 | Drumm |
| 2015/0101428 A1* | 4/2015 | Mizuuchi .............. F16H 57/029 74/89.23 |
| 2015/0249377 A1 | 9/2015 | Zeng et al. |
| 2015/0285347 A1* | 10/2015 | Ohnishi .................. H02K 7/06 74/89.36 |

(Continued)

OTHER PUBLICATIONS

European Patent Office, Extended European Search Report, Application No. 20153895.6, dated Jun. 3, 2020, 10 pages.

*Primary Examiner* — David M Fenstermacher
(74) *Attorney, Agent, or Firm* — Quarles & Brady LLP

(57) ABSTRACT

A linear actuator is provided. The linear actuator includes a rotor assembly including a rotor and a lead screw. The lead screw is rotationally coupled to the rotor for rotation therewith. The linear actuator further includes a stator assembly configured to selectively rotate the rotor in a desired direction, and a body assembly having a shaft and a shaft tube. The shaft is keyed to the shaft tube and prevented from rotating with the rotor. The shaft includes an inner bore configured to threadably receive the lead screw therein. Selective rotation is configured to displace the shaft between an extended position and a retracted position.

18 Claims, 19 Drawing Sheets

(56) References Cited

U.S. PATENT DOCUMENTS

| | | | | |
|---|---|---|---|---|
| 2016/0076631 A1* | 3/2016 | Funada | ............... | F16H 25/2204 |
| | | | | 74/89.4 |
| 2017/0152926 A1* | 6/2017 | Ikeda | ................. | F16H 25/2015 |
| 2017/0350479 A1* | 12/2017 | Shimizu | ................. | B25B 27/20 |
| 2018/0375406 A1* | 12/2018 | Healey | ................. | H02K 5/1735 |
| 2020/0040990 A1* | 2/2020 | Bartolotta | ............. | H02K 41/02 |
| 2020/0300343 A1* | 9/2020 | Bekircan | ............. | F16H 25/2228 |
| 2020/0340557 A1* | 10/2020 | Jensch | ................. | H02K 7/116 |

* cited by examiner

SYSTEMS AND METHODS FOR A LINEAR ACTUATOR

CROSS-REFERENCES TO RELATED APPLICATIONS

The present application is based on, claims priority to, and incorporates herein by reference in its entirety, U.S. Provisional Patent Application No. 62/797,705, filed on Jan. 28, 2019, and entitled "Systems and Methods for a Linear Actuator."

STATEMENT REGARDING FEDERALLY SPONSORED RESEARCH

Not Applicable.

BACKGROUND

Generally, linear actuators may include in an internal motor having a rotor and a stator. The stator may generate a magnetic field that forces the rotor to rotate relative to the stator. The rotation of the rotor may be converted into linear motion by a lead screw or shaft.

BRIEF SUMMARY

In one aspect, the present disclosure provides a linear actuator including a rotor assembly having a rotor and a lead screw. The lead screw is rotationally coupled to the rotor for rotation therewith. The linear actuator further includes a stator assembly configured to selectively rotate the rotor in a desired direction, and a body assembly having a shaft and a shaft tube. The shaft includes an inner bore configured to threadably receive the lead screw therein. The shaft further includes a shaft slot extending axially therealong. A shaft pin can be inserted through the shaft tube and received within the shaft slot to key the shaft to the shaft tube and prevent the shaft from rotating with the rotor. In addition, an interaction between the shaft pin and the shaft slot overlaps with the lead screw. Selective rotation of the rotor assembly is configured to displace the shaft between an extended position and a retracted position.

In another aspect, the present disclosure provides a linear actuator including a rotor assembly having a rotor and a nut. The nut is rotationally coupled to the rotor for rotation therewith. The linear actuator further includes a stator assembly configured to selectively rotate the rotor in a desired direction, and a body assembly having a shaft threadably coupled to the nut. The shaft keyed to an anti-rotation pin and prevented from rotating with the rotor. Selective rotation of the rotor assembly is configured to displace the shaft between an extended position and a retracted position.

In another aspect, the present disclosure provides a linear actuator comprising a rotor assembly including a rotor and a nut. The nut is rotationally coupled to the rotor for rotation therewith. The linear actuator further includes a stator assembly configured to selectively rotate the rotor in a desired direction, and a body assembly including a body configured to slidably receive a shaft threadably coupled to the nut. The shaft is keyed to the body and prevented from rotating with the rotor. Selective rotation of the rotor assembly is configured to displace the shaft between an extended position and a retracted position.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
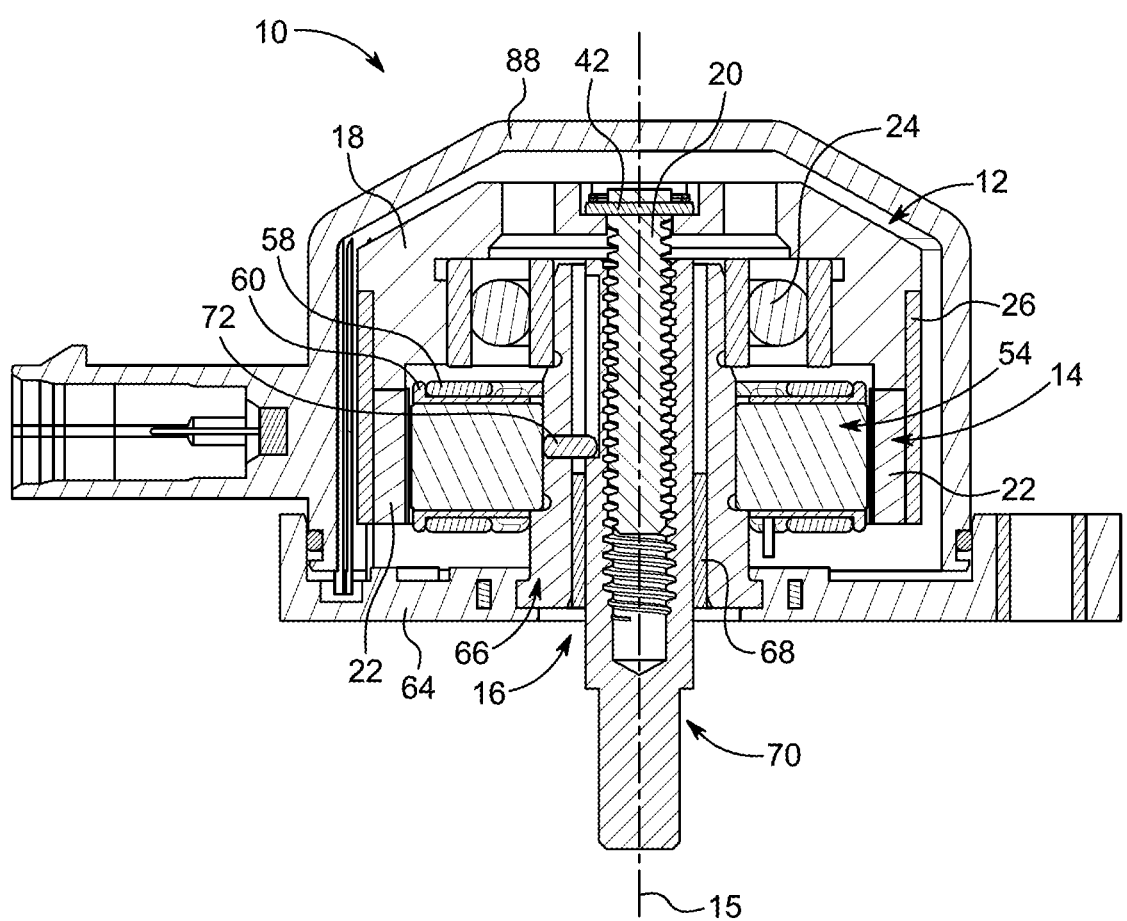
FIG. 1 is a cross-sectional view of a linear actuator according to one aspect of the present disclosure.

The use herein of the term "axial" and variations thereof refers to a direction that extends generally along an axis of symmetry, a central axis, or an elongate direction of a particular component or system. For example, axially extending features of a component may be features that extend generally along a direction that is parallel to an axis of symmetry or an elongate direction of that component. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to directions that extend rotationally around a corresponding axial direction. For example, circumferentially arranged or extending features of a component may be features that are arranged around or extend along a direction that corresponds with a circumference of a circle with a center defined at an axis of symmetry, central axis, or elongate direction of that component.

Conventional linear actuators include a shaft, or lead screw, and a nut, with one coupled to a rotor for rotation therewith and the other rotationally fixed (i.e., prevented from rotating with the rotor). Typically, one length of the shaft is used for anti-rotation and another separate length of the shaft is threaded to facilitate linear actuation of the shaft in response to rotation of the lead screw or nut via the rotor. This design implemented by conventional linear actuators significantly increases a length or height thereof (i.e., a size of the actuator in a direction parallel with the actuation of the shaft), due to the requirement to accommodate at least two lengths of the shaft equal to a stroke of the actuator (one for anti-rotation and another for actuation). In some instances, conventional actuations utilize a sensor (e.g., a Hall Effect sensor) to track an actuation position of the shaft. This sensor may require yet another length of shaft separate from the anti-rotation and threaded sections, which further increases a length or height of the actuator. Each of the sections along the shaft may be required to extend a length that is equal to or greater than a stroke of the actuator. Thus, conventional actuators may require a shaft that extends a distance of at least two times a stroke of the actuator (and in some instances, three times).

Generally, the present disclosure provides a linear actuator that may be designed to enable the various sections arranged along the shaft to axially overlap, as will be described herein. For example, the functionality of a conventional actuator may be achieved while reducing a length or height of the actuator by at least a distance equal to a stroke of the actuator. In this way, a packaging size occupied by the actuator may be significantly reduced, which enables the actuator to occupy less space in a given application.

Figure 2:
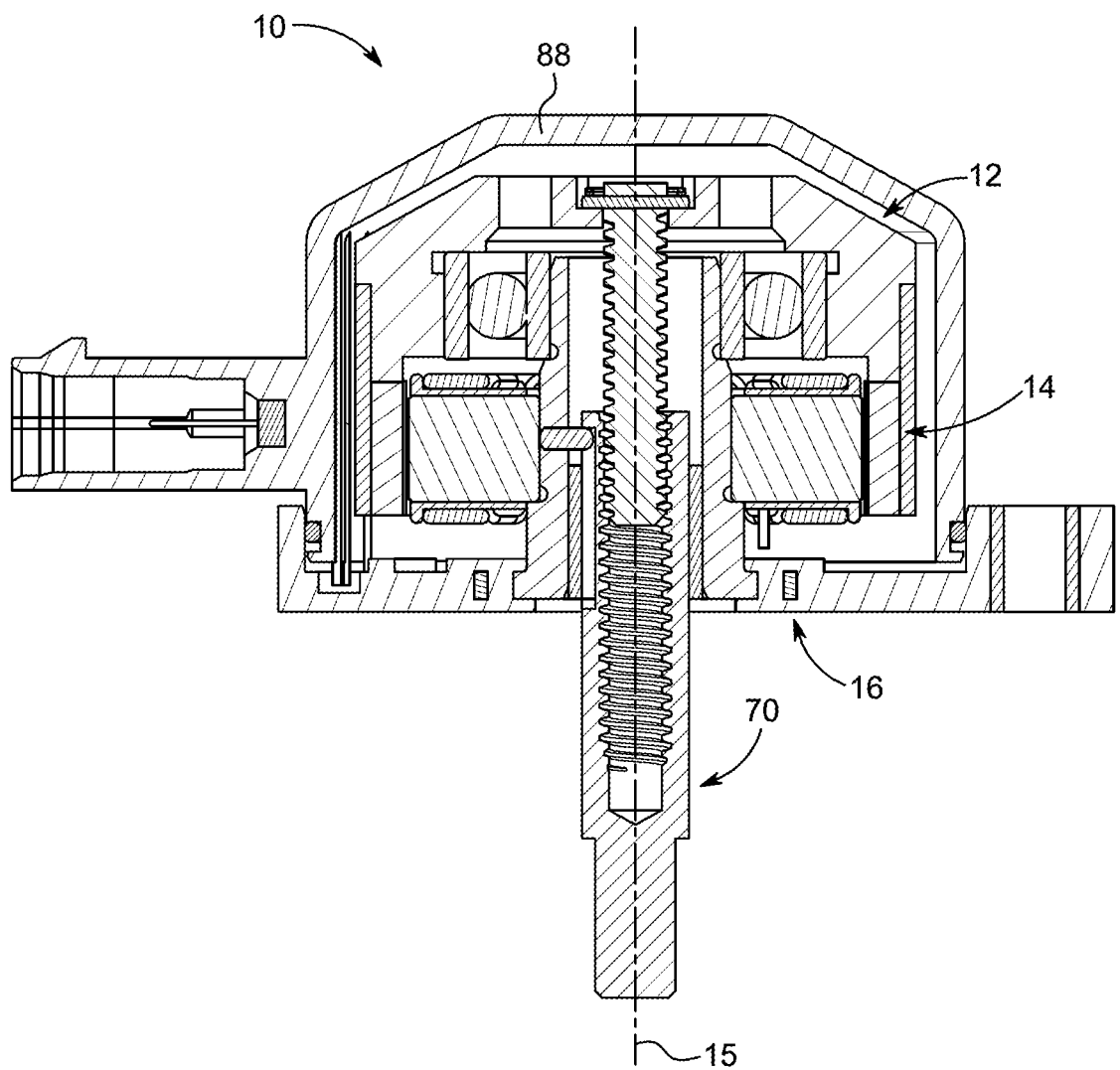
FIG. 2 is a cross-sectional view of the linear actuator of FIG. 1 with a shaft in an extended position.

FIGS. 1 and 2 illustrate one non-limiting example of a linear actuator 10 according to the present disclosure. The linear actuator 10 may include a rotor assembly 12, a stator assembly 14, and a body assembly 16. In the some non-limiting examples, the rotor assembly 12 and the stator assembly 14 may at least partially combine to form a brushless direct-current (BLDC) motor, or a permanent magnet synchronous motor (PMSM). In either case, the rotor assembly 12 and the stator assembly 14 are generally concentric to each other and positioned around a central axis 15, the central axis 15 defining an axis of rotation for the rotor assembly 12 and an axis in which a shaft can extend therealong, as will be described herein.

Figure 3:
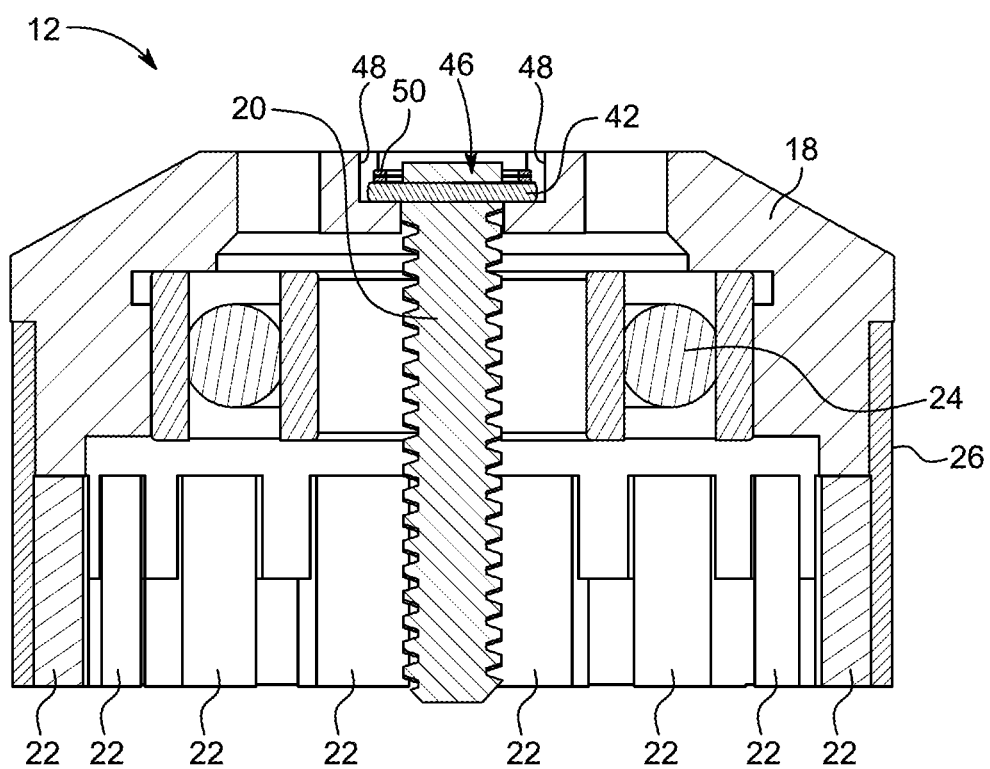
FIG. 3 is a cross-sectional view of a rotor assembly of the linear actuator of FIG. 1.
Figure 4:
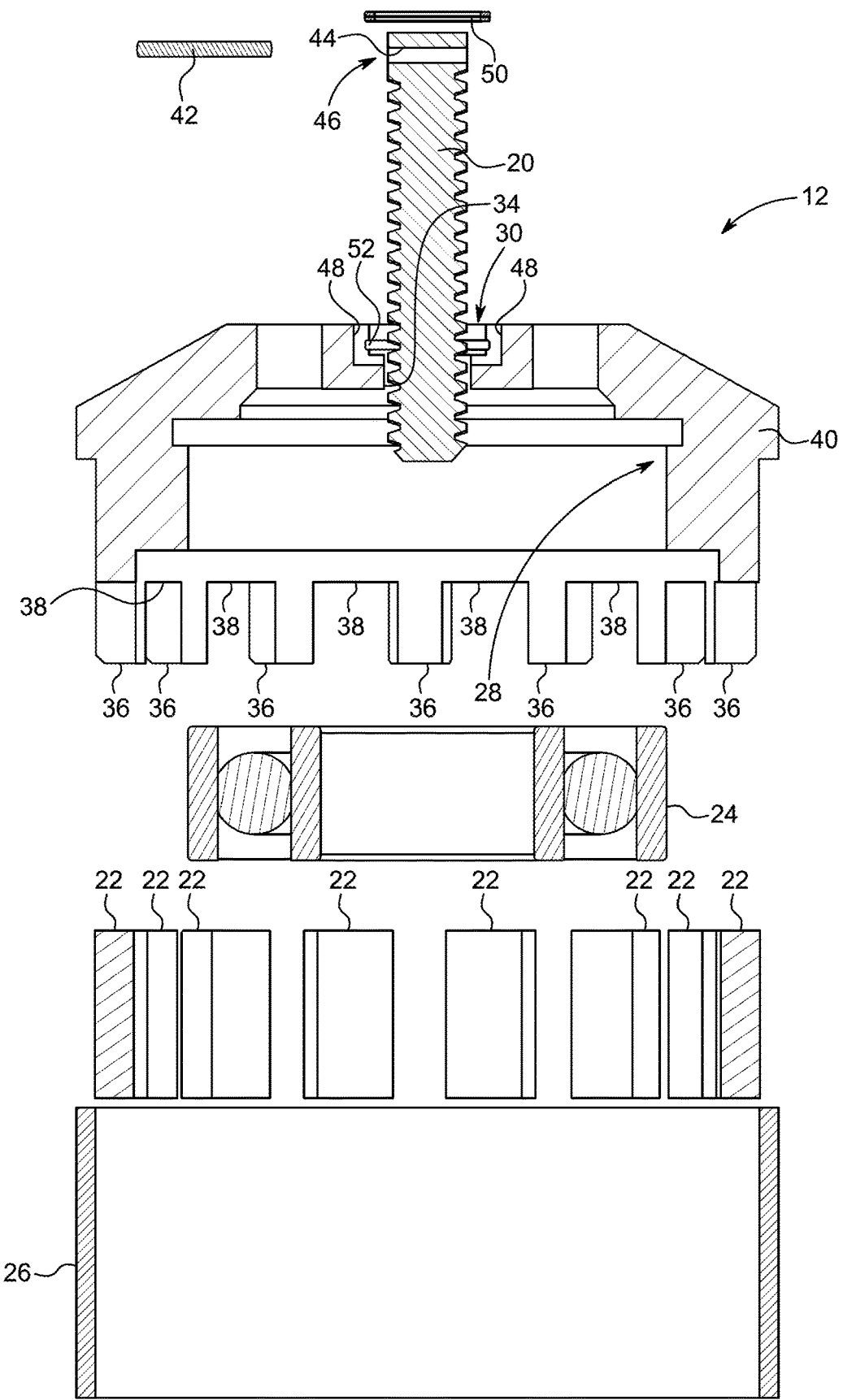
FIG. 4 is an exploded cross-sectional view of the rotor assembly of FIG. 3.
Figure 5:
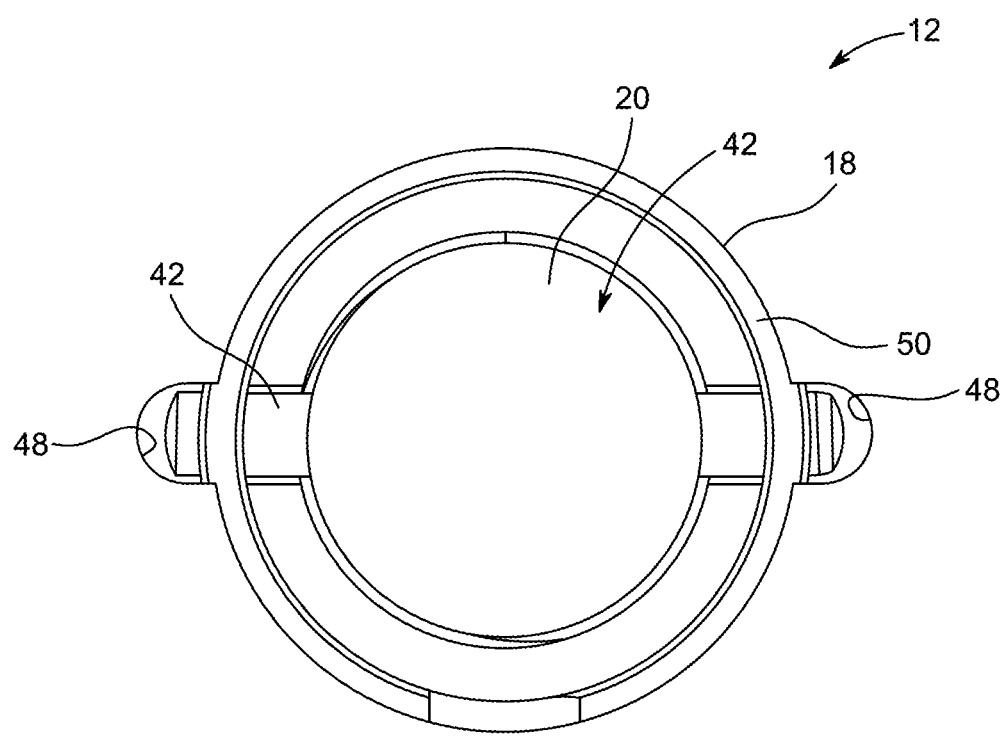
FIG. 5 is a partial top view of the rotor assembly of the linear actuator of FIG. 1.

With reference to FIGS. 3-5, the rotor assembly 12 may include a rotor 18, a lead screw 20, at least one permanent magnet 22, a bearing 24, and a sleeve 26. In the illustrated non-limiting example, the rotor 18 includes a bearing recess 28, a screw recess 30, and at least one magnet arm 36. The bearing recess 28 may be configured to receive the bearing 24 therein via a press-fit. The screw recess 30 may extend axially into the rotor 18 from a top surface thereof, and include a screw aperture 34 extending axially from a bottom surface of the screw recess 30 to a top surface of the bearing recess 28. The lead screw 20 is configured to be inserted through and received within the screw aperture 34.

In the illustrated non-limiting example, the rotor 18 includes a plurality of magnet arms 36 extending axially away from a bottom surface thereof. The magnet arms 36 may be circumferentially spaced from one another to form magnet slots 38 in between circumferentially adjacent pairs of the magnet arms 36. Each of the magnet slots 38 is configured to receive a corresponding permanent magnet 22 therein. In the illustrated non-limiting example, the sleeve 26 is configured to be inserted onto an outer periphery of the rotor 18. A notch 40 that extends radially outward from an outer periphery of the rotor 18 acts as an axial stop for the sleeve 26 when the sleeve is pressed on to the rotor 18.

In general, the lead screw 20 may configured to be rotationally coupled to the rotor 18. That is, the lead screw 20 may be configured to rotate with the rotor 18. In the illustrated non-limiting example, the lead screw 20 may be rotationally fixed to the rotor 18 with a screw pin 42. The screw pin 42 may be inserted through a pin aperture 44 that extends radially through a head 46 of the lead screw 20. When assembled (see, e.g., FIGS. 3 and 5), opposing ends of the screw pin 42 may be received within screw pin slots 48 formed in the screw recess 30 of the rotor 18. In the illustrated non-limiting example, the screw pin slots 48 extend radially into (i.e., away from a center) and axially along the screw recess 30. A snap ring 50 may be received within a ring slot 52 of the screw recess 30, such that the screw pin 42 is axially constrained relative to the rotor 18. In the illustrated non-limiting example, the screw pin 42 may be sandwiched between the snap ring 50 and the bottom surface of the screw recess 30 to prevent the lead screw 20 from displacing axially relative to the rotor 18.

Figure 6:
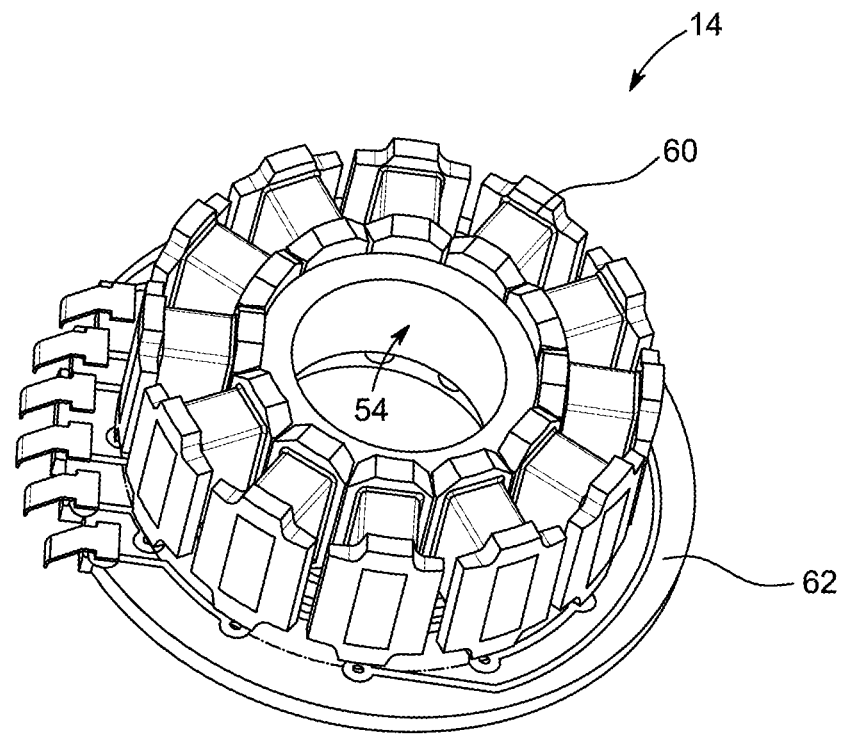
FIG. 6 is a perspective view of a stator assembly of the linear actuator of FIG. 1.
Figure 7:
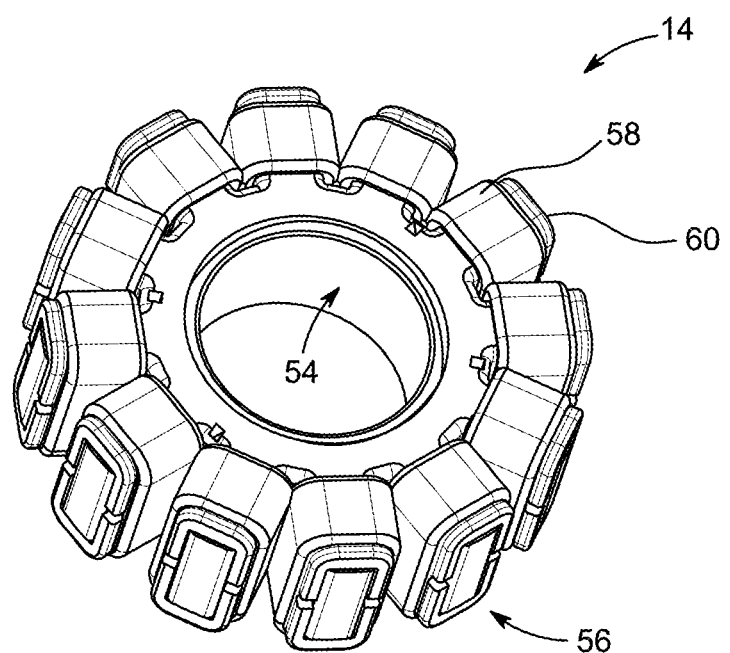
FIG. 7 is a perspective view of the stator assembly of FIG. 6 including wire coils.

Turning to FIGS. 6 and 7, the stator assembly 14 may include a stator core 54 having a plurality of pole cores 56 arranged circumferentially therearound. Each of the pole cores 56 may include a wire coil 58 wrapped around a bobbin 60. In some non-limiting examples, the stator core 54 may be arranged upon a printed circuit board (PCB) 62 that may facilitate connection to a controller (not shown). Generally, the stator assembly 14 may be selectively energized via the controller. In response to being energized, the stator assembly 14 may generate, via electromagnetic force, a rotational force on the permanent magnets 22, which, in turn, rotates the rotor 18. In some non-limiting examples, the controller may be configured to control a direction, speed, and/or torque applied by the stator assembly 14 to the rotor 18.

Figure 8:
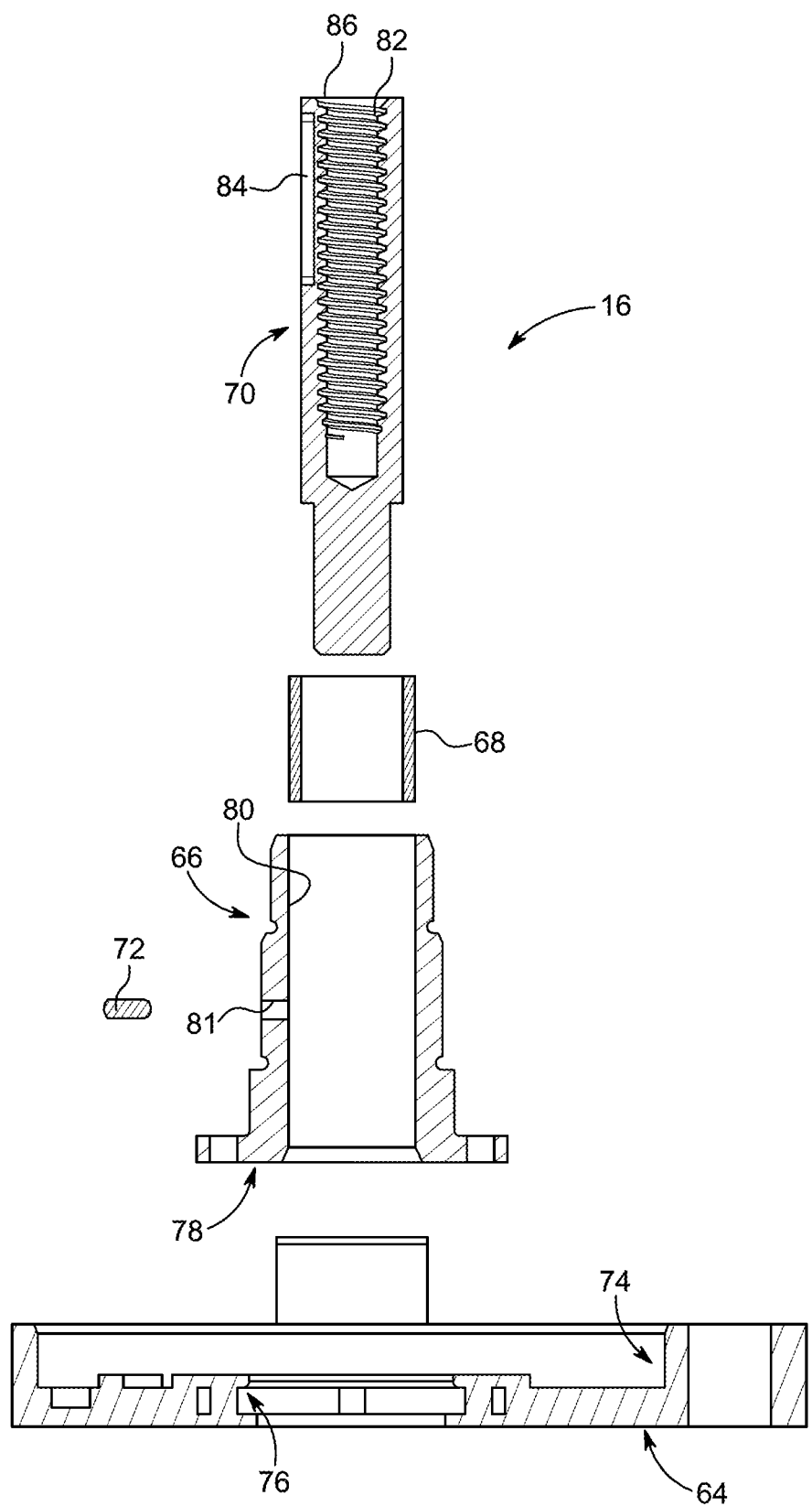
FIG. 8 is an exploded cross-sectional view of a body assembly of the linear actuator of FIG. 1.
Figure 9:
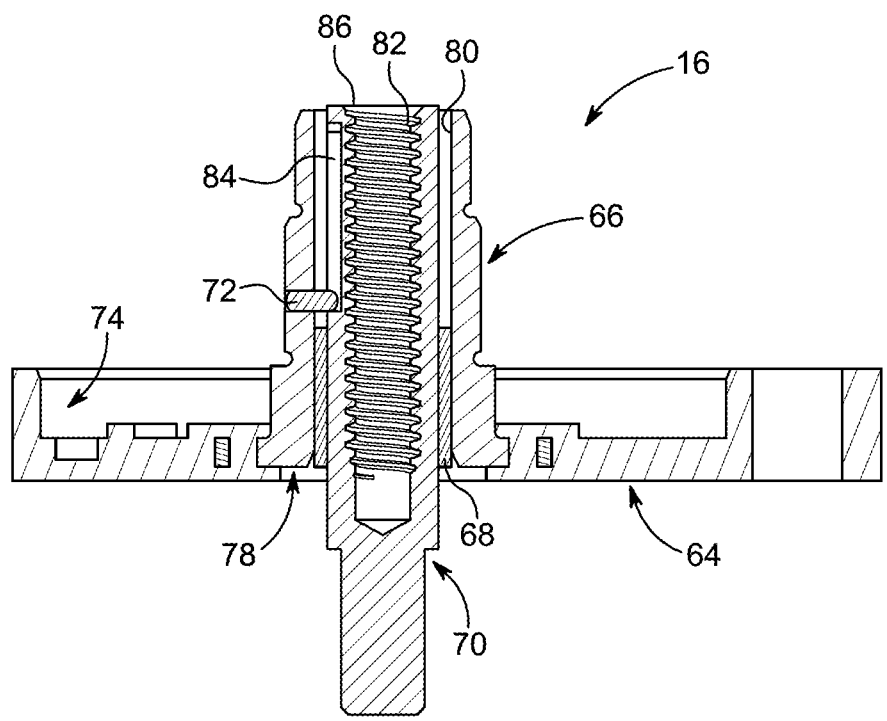
FIG. 9 is a cross-sectional view of the body assembly of FIG. 8 with the body assembly assembled.
Figure 10:
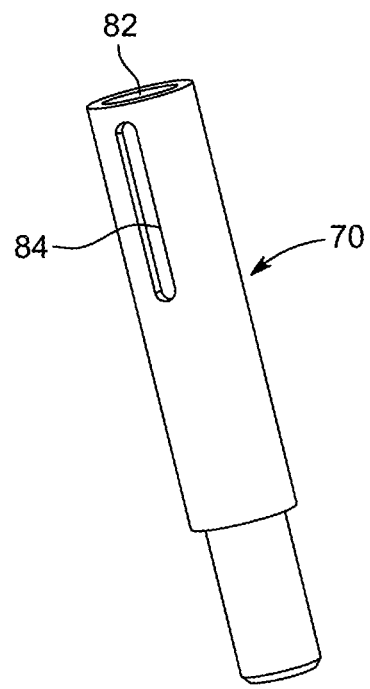
FIG. 10 is a perspective view of a shaft of the body assembly of FIG. 8.

With reference to FIGS. 8-10, the body assembly 16 may include a body 64, a shaft tube 66, a bushing 68, a shaft 70, and a shaft pin 72. The body 64 may include a stator recess 74 formed therein and a tube aperture 76 extending axially therethrough. The stator recess 74 may be configured to receive the stator assembly 14 and a housing 88 therein. The tube aperture 76 may be configured to receive a first end 78 of the shaft tube 66 therein. The bushing 68 may be received within an inner bore 80 of the shaft tube 66 adjacent to the first end 78, such that the bushing 68 is arranged radially between the inner bore 80 and an outer surface of the shaft 70. In the illustrated non-limiting example, the shaft tube 66 may include a shaft pin aperture 81 extending radially therethrough. The shaft pin aperture 81 may be configured to receive the shaft pin 72 therein.

In the illustrated non-limiting example, the shaft 70 includes an internal shaft bore 82 extending axially along a portion of the shaft 70 and a shaft slot 84. The internal shaft bore 82 includes internal threads extending axially thereaalong. When assembled (see, e.g., FIGS. 1 and 2), the internal shaft bore 82 may threadably receive the lead screw 20 therein. The shaft slot 84 may extend radially into and axially along a portion of the outer surface of the shaft 70. In the illustrated non-limiting example, the shaft slot 84 may be arranged adjacent to an open end 86 of the shaft 70. In some non-limiting examples, the shaft slot 84 may extend axially along the shaft 70 a distance approximately equally to a stroke defined by the linear actuator 10.

Assembly and operation of the linear actuator 10 will be described with reference to FIGS. 1-10. The order in which the following assembly and operation are described is not meant to be limiting in any way. Initially, the body assembly 16 may be assembled by installing the shaft tube 66 through the tube aperture 76, such that the first end 78 is arranged therein. In some non-limiting examples, the shaft tube 66 may be a metal (e.g., powdered metal) component and the body 64 may be a plastic component that is molded over the shaft tube 66. The bushing 68 may then be pressed into the inner bore 80 of the shaft tube 66 adjacent to the first end 78 thereof. With the bushing 68 installed within the inner bore 80, the shaft 70 may be inserted axially into the inner bore 80 of the shaft tube 66, such that the shaft slot 84 circumferentially aligns with the shaft pin aperture 81. The shaft pin 72 may be radially inserted through the shaft tube 66 and into the shaft pin aperture 81 and at least partially extend into the shaft slot 84. In this way, for example, the shaft 70 may be rotationally fixed to the body 64. That is, the shaft 70 may be prevented from rotating relative to the rotor assembly 12.

The stator assembly 14 may be installed onto the body assembly 16 by pressing over an outer diameter of the shaft tube 66, or slip fit and keyed to the shaft tube 66 to prevent rotation of the stator assembly 14. The rotor assembly 12 may be installed onto the body 64 and around the stator assembly 14. The bearing 24 may be pressed into the bearing recess 28, and then the rotor assembly 12 may be pressed onto the shaft tube 66 via engagement between the outer diameter of the shaft tube 66 and the inner diameter of the bearing 24. The housing 88 may be installed around the rotor assembly 12, thereby enclosing the rotor assembly 12 and stator assembly 14 between the housing 88 and the body 64.

In operation, the stator assembly 14 may be configured to selectively rotate the rotor assembly 12 relative to the stator assembly 14 in a desired direction. The relative rotation between the stator assembly 14 and the rotor assembly 12 may result in the selective axial displacement of the shaft 70 between an extended position (see, e.g., FIG. 2) and a retracted position (see, e.g., FIG. 1) along the central axis 15. For example, with the lead screw 20 rotationally coupled to the rotor 18 for rotation therewith, via the screw pin 42 extending into the screw pin slots 48 of the rotor 18, rotation of the rotor 18 results in rotation of the lead screw 20. Since the lead screw 20 is threaded into the internal shaft bore 82 of the shaft 70, and shaft pin 72 within the shaft slot 84 prevents the shaft 70 from rotating relative to the rotor 18, rotation of the rotor 18 results in axial displacement of the shaft 70 between the extended position and the retracted position.

In general, the anti-rotation of the shaft 70 occurs along the same axial length as the threaded relationship between the lead screw 20 and the shaft 70, which allows the linear actuator 10 to define a reduced axial height when compared with conventional actuators. In the illustrated non-limiting example, the interaction between the shaft pin 72 and the shaft slot 84 axially overlaps with the lead screw 20. That is, the lead screw 20 defines an axial length (e.g., a length of the lead screw 20 along the central axis 15), and the shaft pin 72 engages with the shaft slot 84 along a least a portion of the axial length defined by the lead screw 20. In some embodiments, the design and properties of the linear actuator 10 also allow a position sensor to be implemented along the same axial length of the shaft 70 as the threaded interaction between the shaft 70 and the lead screw 20. In this way, for example, the height of the linear actuator 10 may not be required to occupy at least three times the stroke defined by the actuator (i.e., a linear distance between the extended position and the retracted position) to accommodate the actuation, the anti-rotation, and the position sensor similar to conventional actuators.

Figure 11:
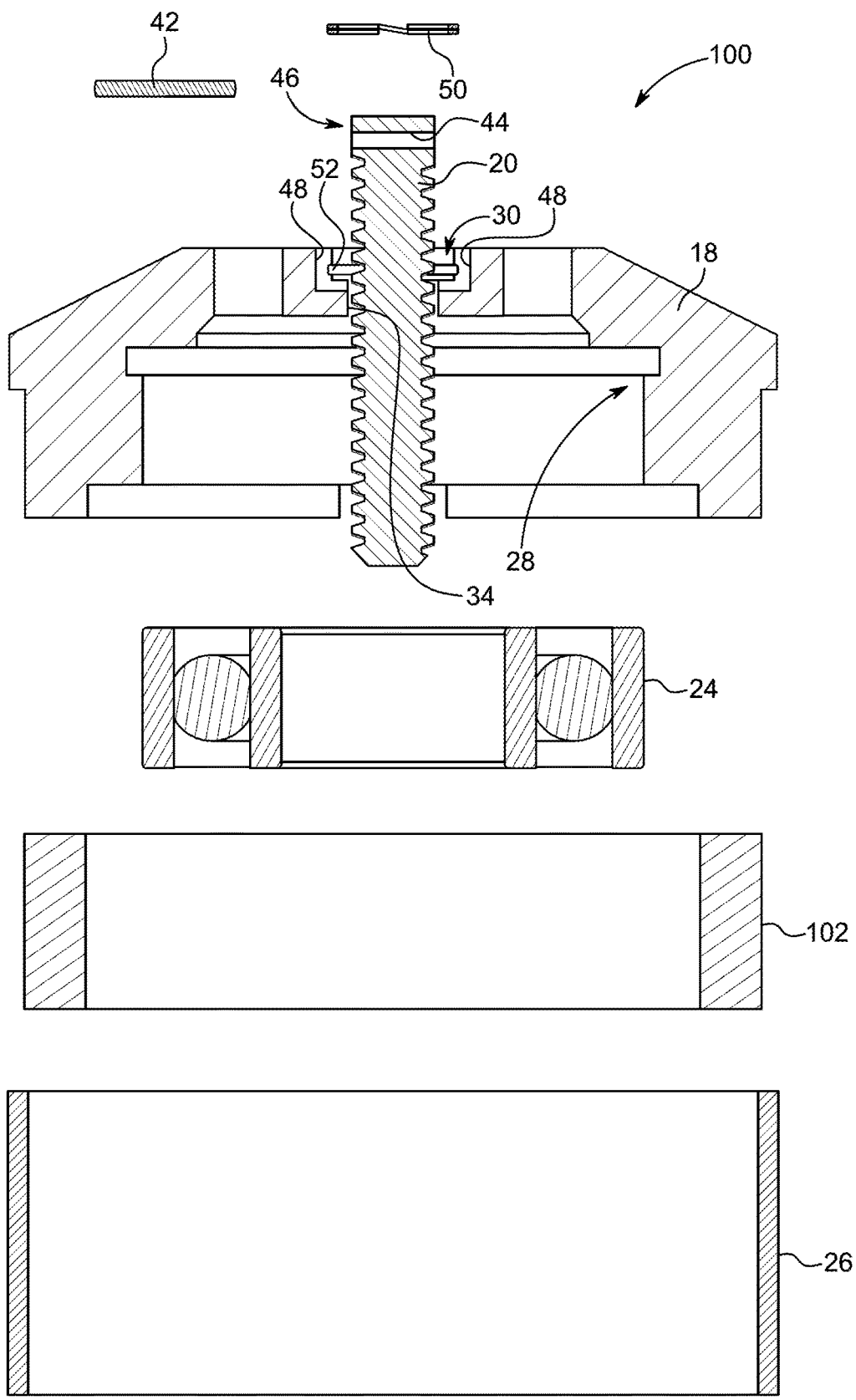
FIG. 11 is an exploded cross-sectional view of a rotor assembly of the linear actuator of FIG. 1 according to another aspect of the present disclosure.

FIG. 11 illustrates another non-limiting example of a rotor assembly 100 of the linear actuator 10. The rotor assembly 100 may be similar in design and functionality to the rotor assembly 12, with similar elements identified using like reference numerals, except as described herein or as apparent from the figures. In the illustrated non-limiting example, the rotor assembly 100 may include a permanent magnet ring 102 as opposed to the circumferentially arranged permanent magnets 22 of the rotor assembly 12. In some non-limiting examples, the permanent magnet ring 102 may be attached to an inner diameter of the sleeve 26 via an adhesive. In some non-limiting examples, a bottom portion of the sleeve 26 may be crimped, or angled radially inward, and engage a chamfer or beveled edge formed in the bottom portion of the permanent magnet ring 102 to axially constrain the permanent magnet ring 102 in the rotor assembly 100.

Figure 12:
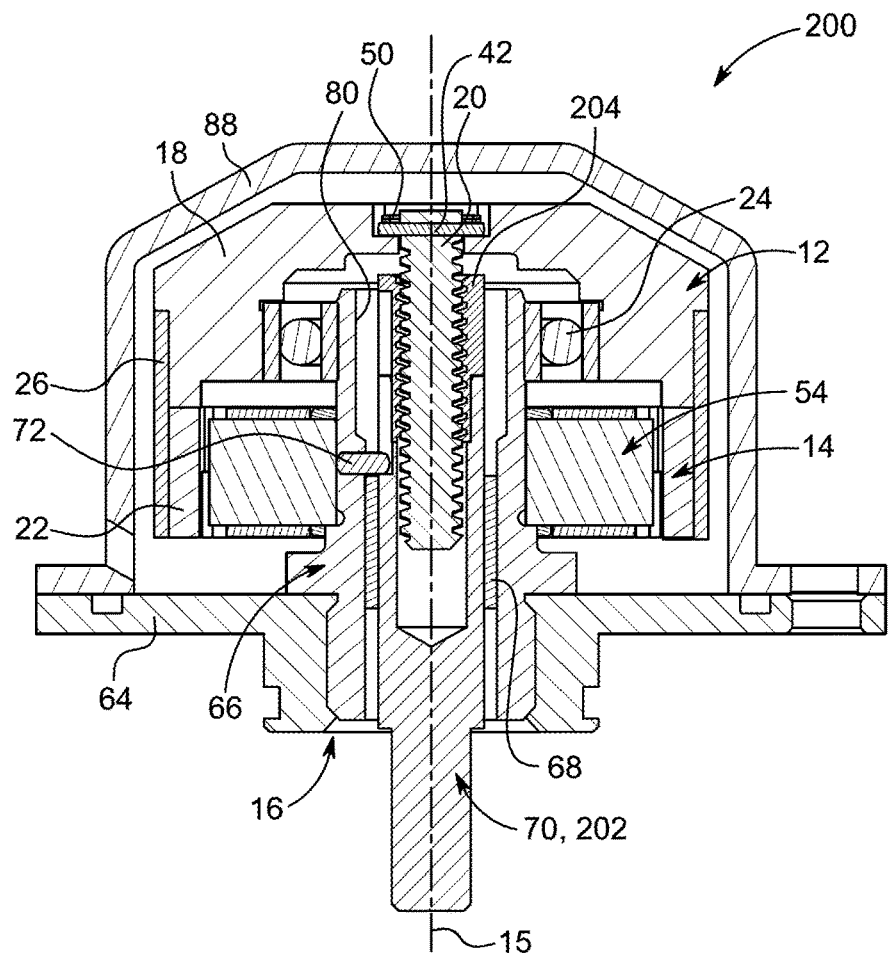
FIG. 12 is a cross-sectional view of a linear actuator according to another aspect of the present disclosure.

FIG. 12 illustrates another non-limiting example of a linear actuator 200 according to one aspect of the present disclosure. In the illustrated non-limiting example, the bearing 24 may define a reduced radial width. In this way, for example, an increased radial clearance may be provided between the inner bore 80 of the shaft tube 66 and the outer surface of the shaft 70. In some embodiments, a position sensor may be arranged in this radial clearance that provides an indication of a position of the shaft 70 between the extended position and the retracted position, as will be described herein.

Figure 13:
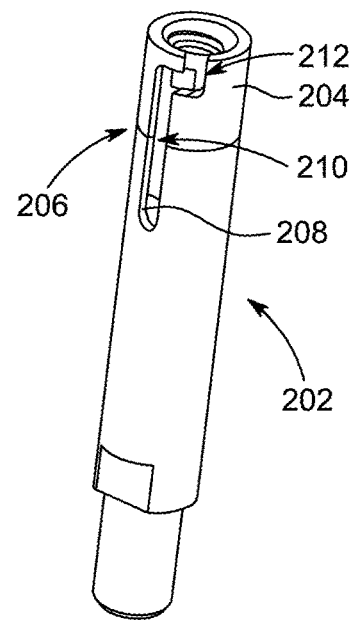
FIG. 13 is a perspective view of a shaft of the linear actuator of FIG. 12.

With specific reference to FIGS. 12-13, in the illustrated non-limiting example, the linear actuator 200 includes a shaft 202 having a shaft nut 204 pressed onto an open end 206 of the shaft 202 (i.e., an end configured to receive the lead screw 20). The shaft 202 may be similar in design and functionality to the shaft 70, with similar elements identified using like reference numerals, except as described herein or as apparent from the figures. Generally, the shaft nut 204 may be a cylindrical continuation of the shaft 202. A shaft slot 208 may extend radially into and axially along a portion of the outer surface of the shaft 202 and a portion of the outer surface of the shaft nut 204. In the illustrated non-limiting example, the shaft slot 208 may be arranged adjacent to the open end 206 of the shaft 202. In the illustrated non-limiting example, the shaft slot 208 may include a stroke portion 210 and a removal portion 212. The stroke portion 210 may extend axially along the shaft 202 and the shaft nut 204 a distance approximately equal to a stroke length defined by the linear actuator 200. The removal portion 212 may be circumferentially offset from the stroke portion 210 and may extend axially along the shaft nut 204 to an end thereof. The continuous extension of the shaft slot 208 to an end of the shaft nut 204 enables the shaft 202 to be removed without requiring the body assembly 16 to be disassembled.

Figure 14:
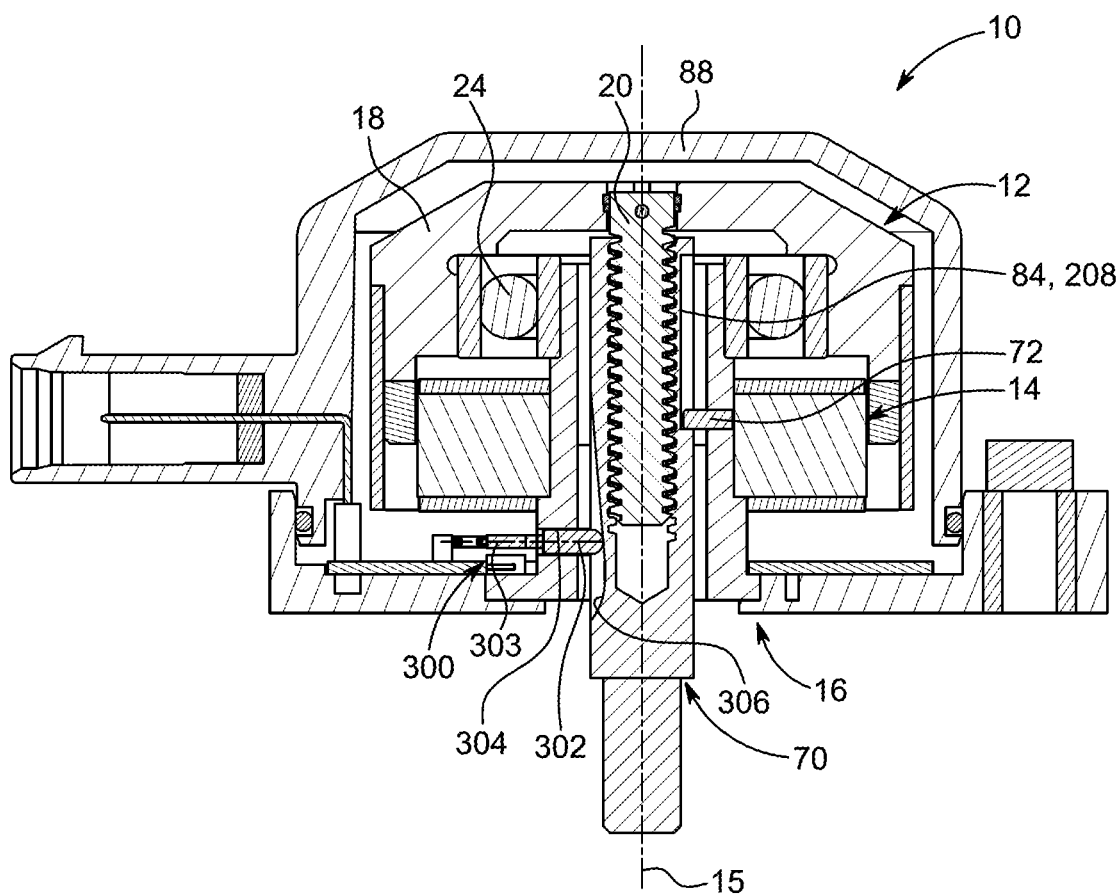
FIG. 14 is a cross-sectional view of a linear actuator including a position sensor according to one aspect of the present disclosure.

FIG. 14 illustrates one non-limiting example of a position sensor 300 that may be used in the linear actuator 10, or any other linear actuator described herein. In the illustrated non-limiting example, the position sensor 300 may be a hall effect sensor that includes a sensor pin 302 with a target magnet 303 coupled there to and that extends through a sensor pin slot 304, which extends radially through the shaft tube 66 and the bushing 68. A position of the target magnet 303 may be sensed by the position sensor 300, and a signal output by the position sensor 300 may vary in response to a position of the target magnet 303.

In the illustrated non-limiting example, the sensor pin 302 may engage a sensor slot 306 formed in the shaft 70, 202 on a circumferentially opposing side as the shaft slot 84, 208. The sensor slot 306 may extend radially into the outer surface of the shaft 70, 202 a distance that varies as the sensor slot 306 extends axially therealong. That is, a unique, or different, radial depth may be defined at each point axially along the sensor slot 306. Thus, the sensor pin 302 and thereby the target magnet 303 may be displaced to a unique position as the shaft 70, 202 is displaced between the extended position and the retracted position. In this way, for example, the position/sensor 300 may output a signal proportional to a position of the shaft 70, 202.

Figure 15:
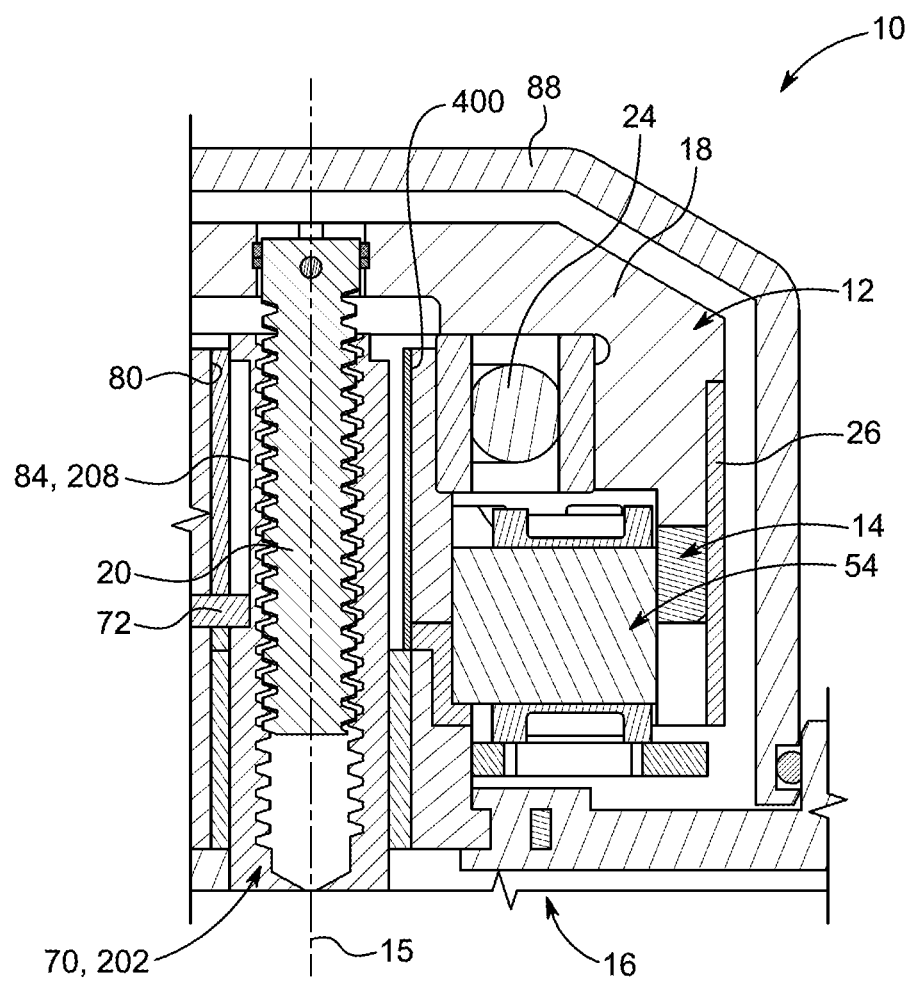
FIG. 15 is a partial cross-sectional view of a linear actuator including a position sensor with a shaft in a retracted position according to one aspect of the present disclosure.
Figure 16:
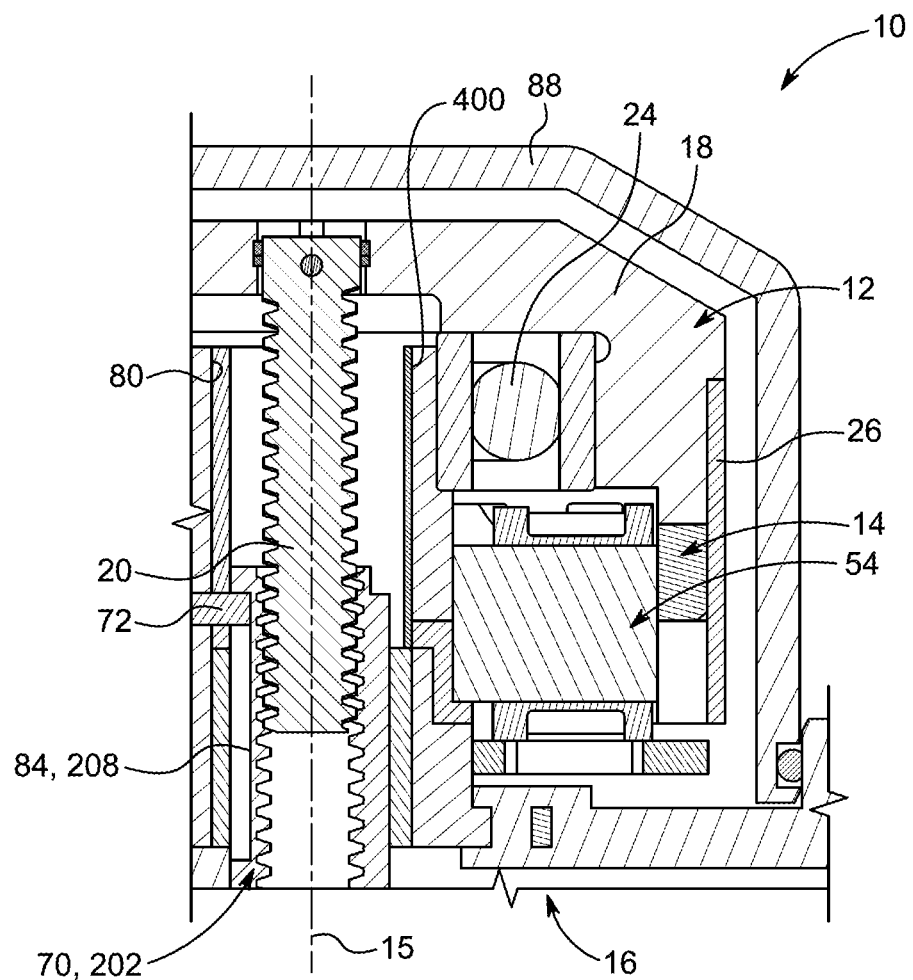
FIG. 16 is a partial cross-sectional view of the linear actuator of FIG. 15 with a shaft in an extended position.

FIGS. 15 and 16 illustrate another non-limiting example of a position sensor 400 that may be used in the linear actuator 10, or any other linear actuator described herein. In the illustrated non-limiting example, the position sensor 400 may be arranged within a radial clearance between the inner bore 80 of the shaft tube 66 and the outer surface of the shaft 70, 202. In some non-limiting examples, the position sensor 400 may be a flexible PCB coil that utilizes a module for inductance to digital conversion to sense a position of the shaft 70, 202 between the retracted position (FIG. 15) and the extended position (FIG. 16).

Figure 17:
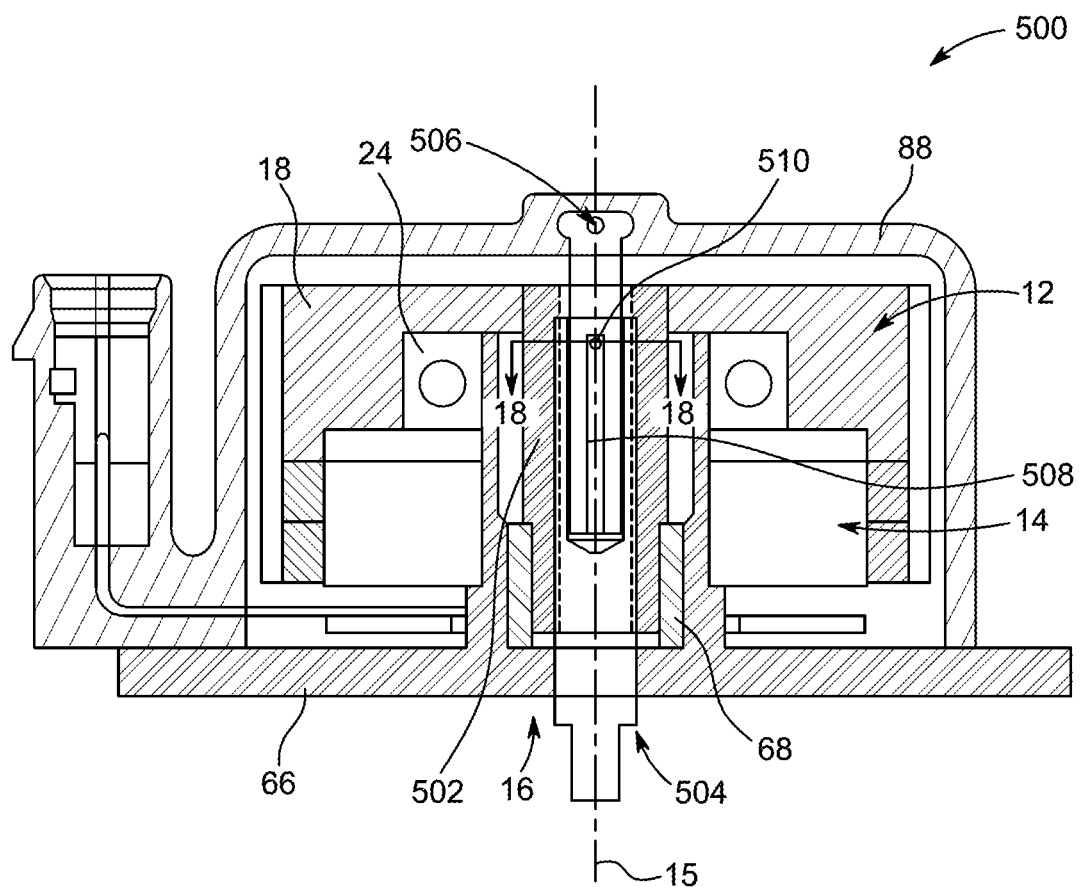
FIG. 17 is a cross-sectional view of a linear actuator according to another aspect of the present disclosure.
Figure 18:
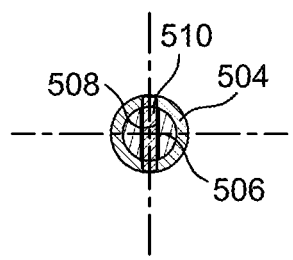
FIG. 18 is a cross-section view of an anti-rotation pin of the linear actuator of FIG. 17 taken along line 18-18.

FIGS. 17-18 illustrate another non-limiting example of a linear actuator 500 according to the present disclosure. The linear actuator 500 may be similar in design and functionality to the linear actuator 10, with similar elements identified using like reference numerals, except as described herein or as apparent from the figures. In the illustrated non-limiting example, the body 64 and the shaft tube 66 may be formed as a unitary component. In the illustrated non-limiting example, the rotor assembly 12 may include a nut 502 that is rotationally coupled to the rotor 18 for rotation therewith. In some non-limiting examples, the nut 502 may include internal threads that threadably interact with external threads on a shaft 504.

An anti-rotation pin 506 may extend axially through the inner bores of the nut 502 and the shaft 504, such that the anti-rotation pin 506 is concentric to the inner bores of the nut 502 and the shaft 504. One end of the anti-rotation pin 506 may be keyed to the housing 88, such that the anti-rotation pin 506 is prevented from rotating with the rotor 18. For example, the anti-rotation pin 506 can be rotationally fixed to the housing 88 by a pin extending through a head of the anti-rotation pin 506 and engaging with an upper end (e.g., from the perspective of FIG. 17) of the housing 88 to provide the keying between the housing 88 and the anti-rotation pin 506. The anti-rotation pin 506 may also include a slot 508 through which a slot pin 510 may extend. The slot 508 may extend axially along the anti-rotation pin 506 at distance at least equal to a stroke of the linear actuator 500. In the illustrated non-limiting example, the slot pin 510 may extend through the slot 508 and opposing ends of the slot pin 510 may be in engagement with the shaft 504. In this way, for example, the shaft 504 may be prevented from rotating with the rotor 18 due to the anti-rotation pin 506 being keyed with the housing 88. In operation, with the shaft 504 prevented from rotating with the rotor 18, rotation of the nut 502 results in linear motion of the shaft 504 along the central axis 15 due to the threaded interaction between the nut 502 and the shaft 504.

Similar to the linear actuator 10, the anti-rotation of the shaft 504 occurs along the same axial length as the threaded relationship between the nut 502 and the shaft 504, which allows the linear actuator 500 to define a reduced axial height when compared with conventional actuators. In the illustrated non-limiting example, the interaction between the slot pin 510 and the slot 508 axially overlaps with the nut 502. That is, the nut 502 defines an axial length (e.g., a length of the nut 502 along the central axis 15), and the slot pin 510 engages with the slot 508 along at least a portion of the axial length defined by the nut 502.

Figure 19:
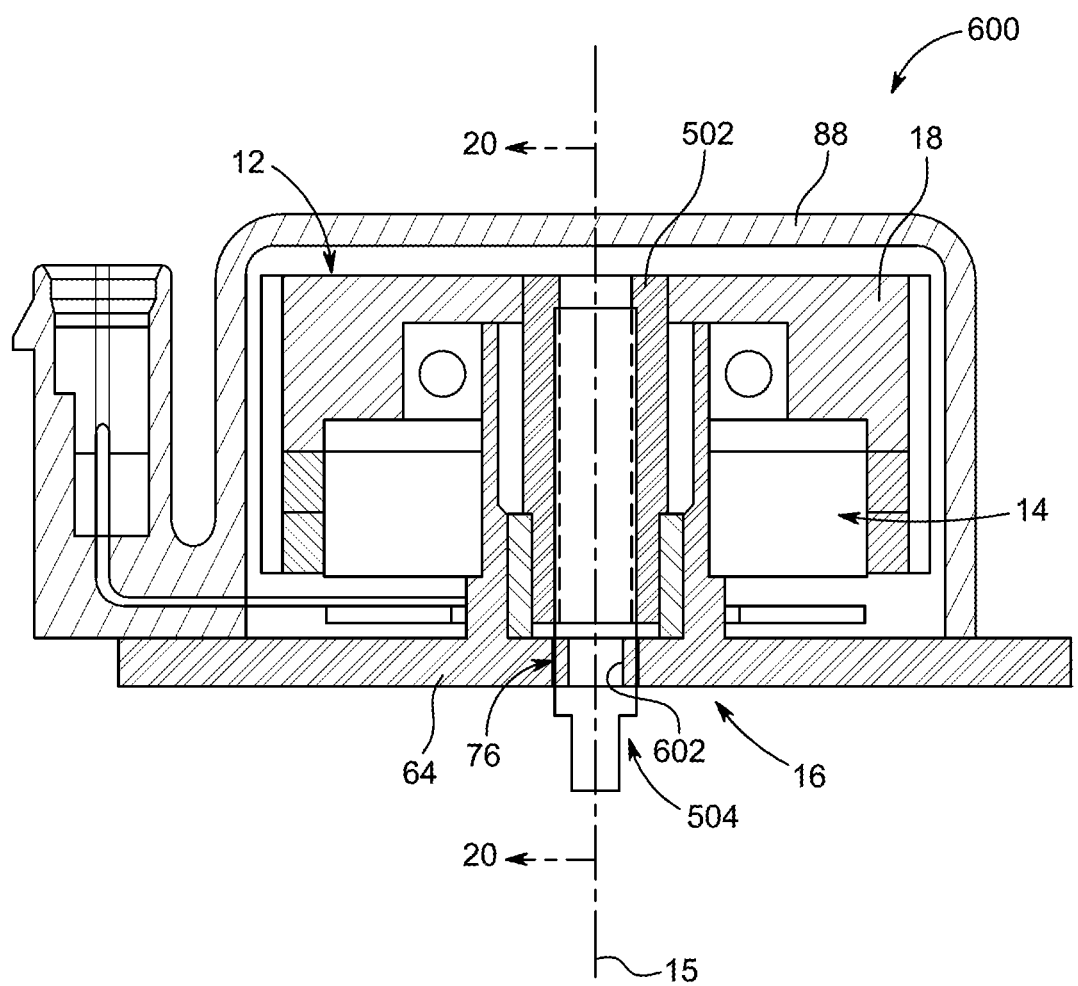
FIG. 19 is a cross-sectional view of a linear actuator according to another aspect of the present disclosure.
Figure 20:
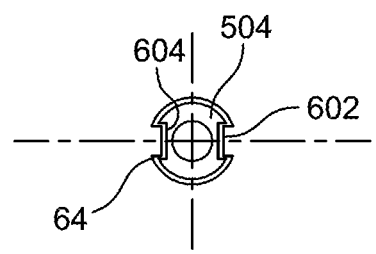
FIG. 20 is a detail view of the bottom of the linear actuator of FIG. 19, detailing an interaction between keyed slots in a body and corresponding recessed slots in a shaft of the linear actuator.
Figure 21:
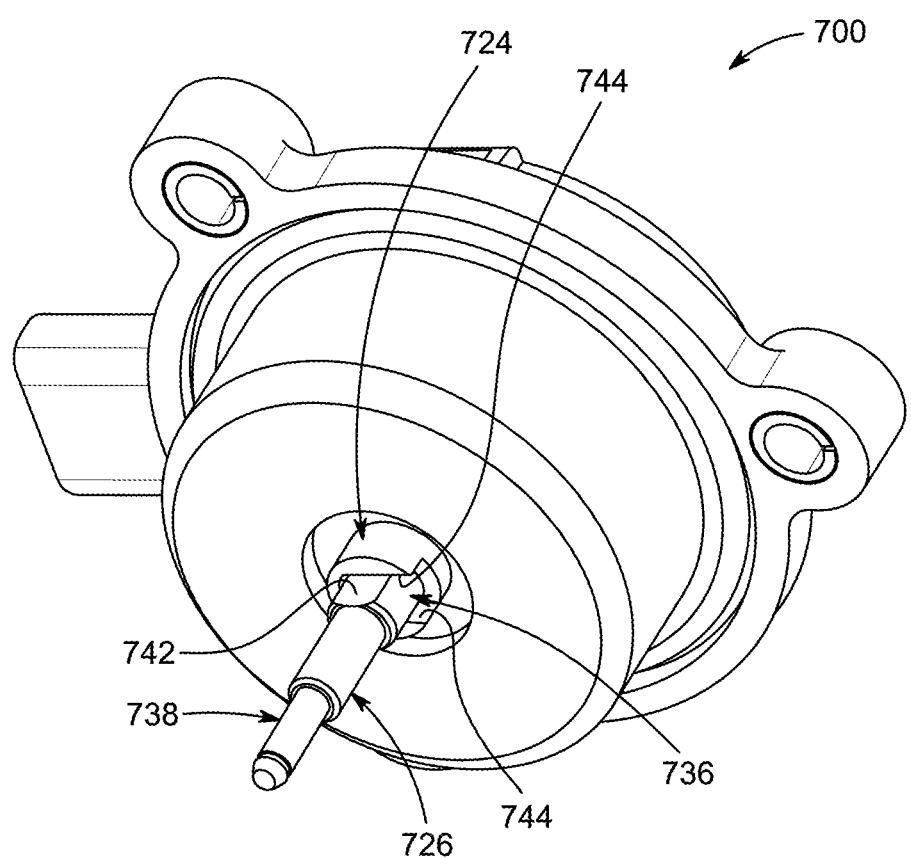
FIG. 21 is a perspective view of a linear actuator according to another aspect of the present disclosure.
Figure 22:
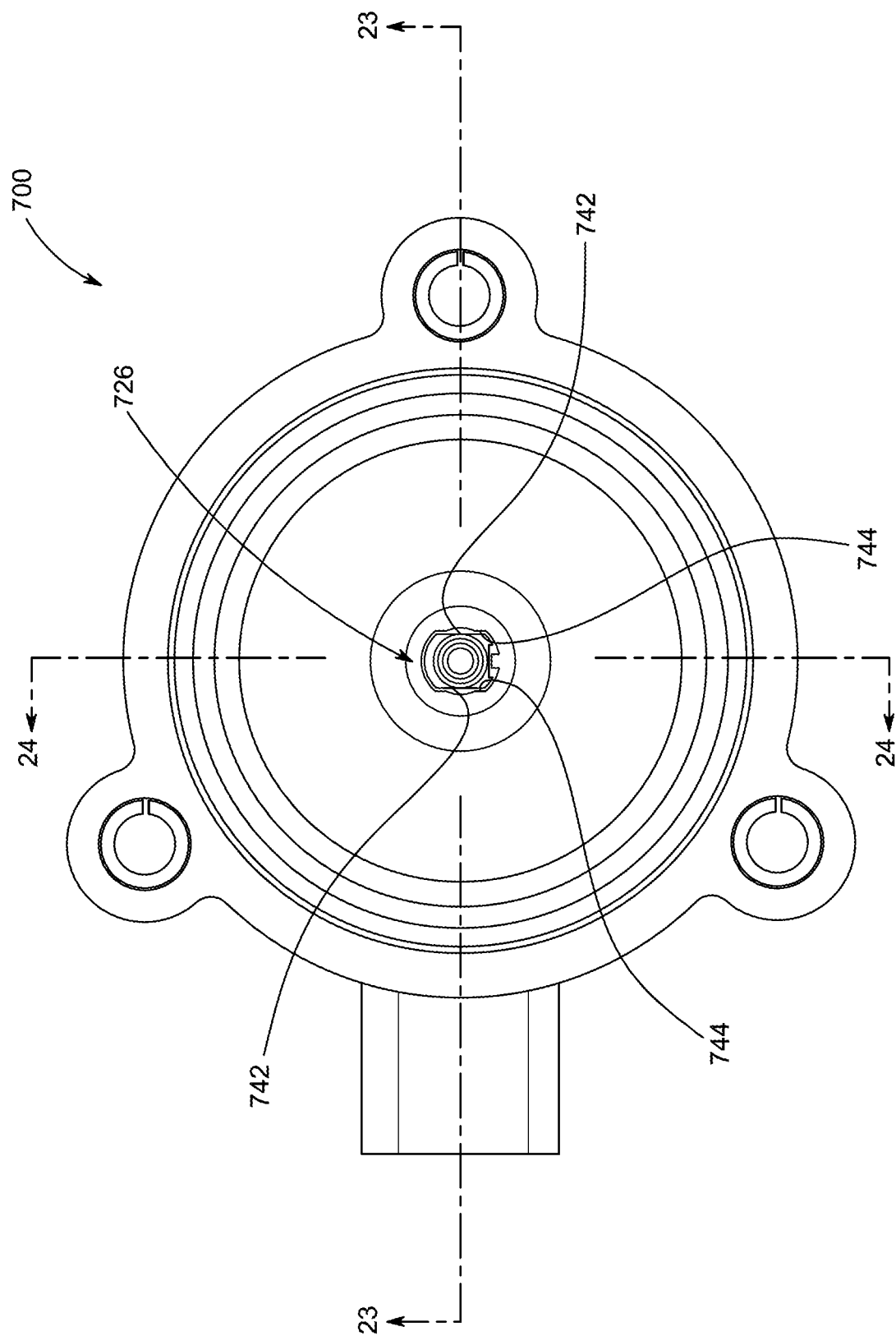
FIG. 22 is a bottom plan view of the linear actuator of FIG. 21.
Figure 23:
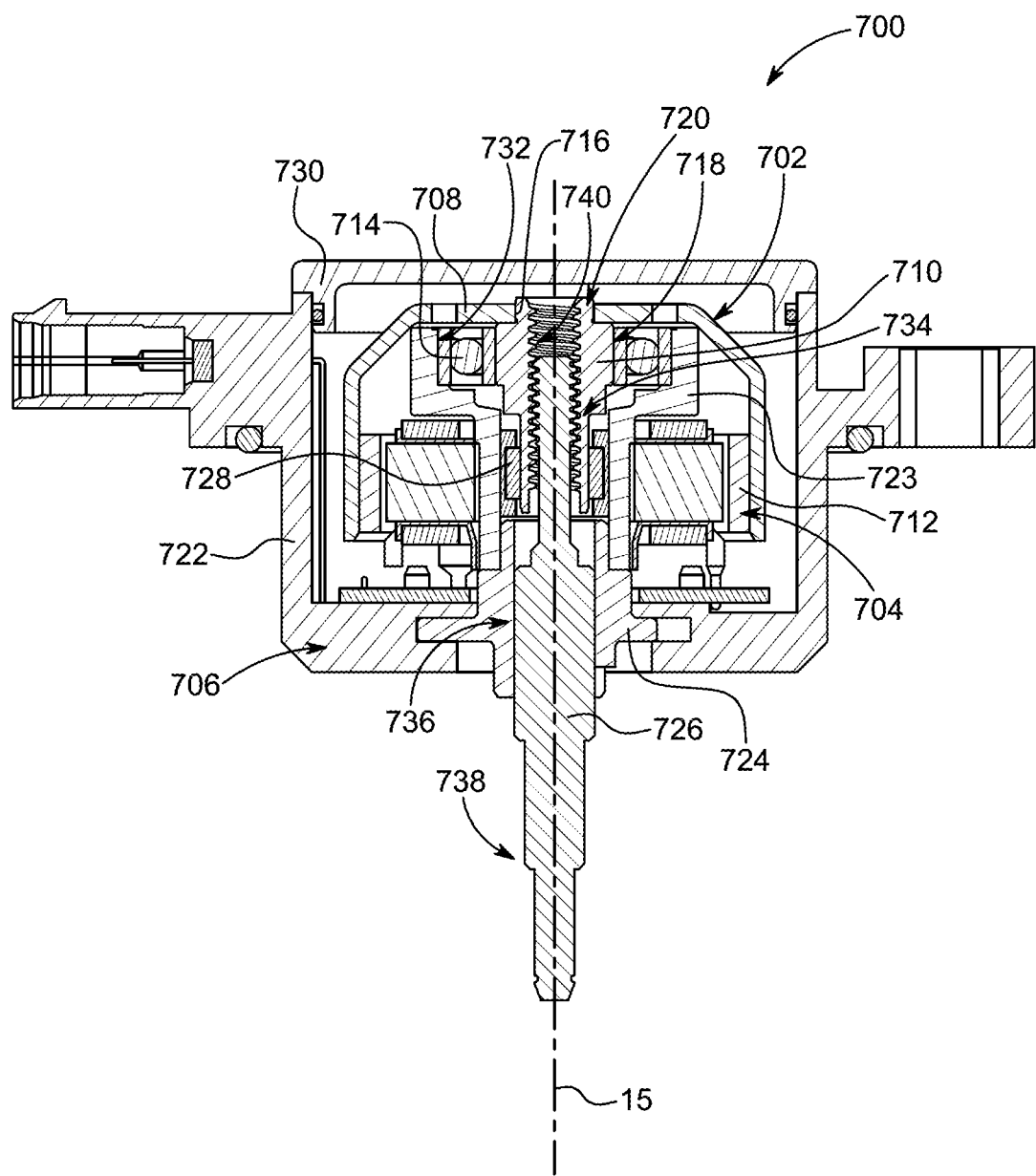
FIG. 23 is a cross-sectional view of the linear actuator of FIG. 22 taken along line 23-23.

FIGS. 19-20 illustrates another non-limiting example of a linear actuator 600 according to the present disclosure. The linear actuator 600 may be similar in design and functionality to the linear actuator 500, with similar elements identified using like reference numerals, except as described herein or as apparent from the figures. In the illustrated non-limiting example, the anti-rotation of the shaft 504 may occur via keyed slots 602 formed in the body 64. The keyed slots 602 may extend radially inward from the tube aperture 76. When assembled, the keyed slots 602 may extend into corresponding recessed slots 604 formed in the shaft 504, thereby preventing the shaft 504 from rotating with the rotor 18.

FIGS. 21-24 illustrated one non-limiting example of a linear actuator 700 according to the present disclosure. The linear actuator 700 may include a rotor assembly 702, a stator assembly 704, and a body assembly 706. In some non-limiting examples, the rotor assembly 702 and the stator assembly 704 may at least partially combine to form a BLDC motor, or a PSMS motor.

The rotor assembly 702 may include a rotor 708, a nut 710, at least one permanent magnet 712, and a bearing 714. The rotor 708 includes a nut aperture 716 that is configured to receive a portion of the nut 710 therein. In the illustrated non-limiting example, the nut 710 includes a nut flange 718 that extends axially along a portion of the nut 710 and radially outward from an outer surface thereof. The nut flange 718 acts as an axial stop for the nut 710 as a first end 720 of the nut 710 is press-fit into the nut aperture 716 of the rotor 708. In some non-limiting examples, the first end 720 of the nut 710 may be press and stake fit into the nut aperture 716. In this way, for example, the nut 710 may be rotationally coupled to the rotor 708 for rotation therewith.

The stator assembly 704 may be similar in design and functionality to the stator assembly 14 of the linear actuator 10. For example, the stator assembly 704 may include a plurality of pole cores arranged circumferentially around a stator core. The stator core may be selectively energized via a controller. In response to being energized, the stator assembly 704 may generate, via electromagnetic force, a rotational force on the at least one permanent magnet 712 attached to the rotor 708, which, in turn, rotates the rotor 708. In some non-limiting examples, the controller may be configured to control a direction, speed, and/or torque applied by the stator assembly 704 to the rotor 708.

The body assembly 706 may include a body 722, a bearing tube 723, a shaft tube 724, a shaft 726, and a shaft bearing 728. A cap 730 may be coupled to an end of the body 722. The body 722 and the cap 730 may enclose the rotor assembly 702 and the stator assembly 704. The bearing tube 723 includes a bearing recess 732 that extends radially outward to receive the bearing 714. The bearing 714 may be arranged within the bearing recess 732 radially in between the nut 710 and the bearing tube 723. The shaft bearing 728 may be axially separated from the bearing 714 and arranged radially between the nut 710 and the bearing tube 723. The shaft tube 724 may be coupled to a first end of the bearing tube 723.

The shaft 726 may include a threaded portion 734, a stroke portion 736, and an actuation end 738. The threaded portion 734 may include external threads that threadably engage internal threads that extend along an inner bore 740 of the nut 710. The stroke portion 736 may include opposing flats 742 that extend laterally into an outer surface thereof and axially along a portion of the stroke portion 736. The flats 742 of the shaft 726 are configured to engage corresponding body flats 744 formed on the shaft tube 724. With the flats 742 in engagement with the body flats 744, the shaft 726 is prevented from rotating relating to the body 722 and, thereby, the nut 710 and the rotor 708.

Figure 24:
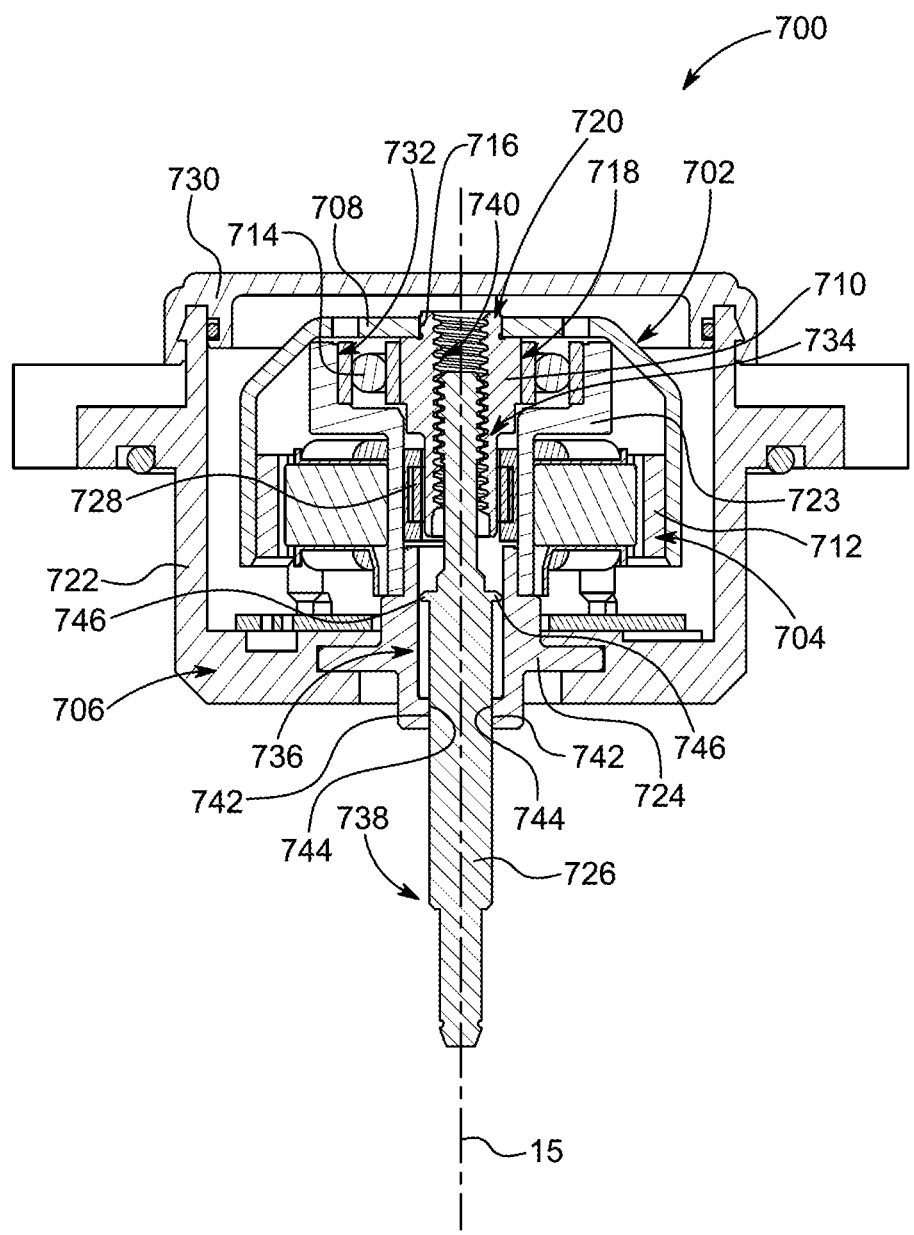
FIG. 24 is a cross-sectional view of the linear actuator of FIG. 22 taken along line 24-24.

With reference to FIG. 24, the shaft 726 may include tabs 746 extending laterally outward from an outer surface thereof at a location axially between the threaded portion 734 and the stroke portion 736. In general, the tabs 746 are configured to engage the shaft tube 724 to act as an axial stop for the axial displacement of the shaft 726 during operation. That is, the axial location of the tabs 746 along the shaft 726 may define a stroke of the linear actuator 700 (e.g., a distance that the shaft 726 travels between an extended position and a retracted position). The tabs 746 can be at an axial position between the threading and the flats 742 on the shaft 726.

During operation, the stator assembly 704 may be configured to selectively rotate the rotor assembly 702 relative to the stator assembly 704 in a desired direction. The relative rotation between the stator assembly 704 and the rotor assembly 702 may result in the selective displacement of the shaft 726 between an extended position (not shown) and a retracted position (see, e.g., FIG. 24). For example, with the nut 710 rotationally coupled to the rotor 708 for rotation therewith, rotation of the rotor 708 results in rotation of the nut 710. Since the nut 710 is threaded onto the threaded portion 734 of the shaft 726 and the flats 742 prevent the shaft 726 from rotating relative to the rotor 708, rotation of the rotor 708 results in axial displacement of the shaft 726 between the extended position and the retracted position.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A linear actuator comprising:
   a rotor assembly including a rotor and a lead screw, wherein the lead screw is rotationally coupled to the rotor for rotation therewith;
   a stator assembly configured to selectively rotate the rotor in a desired direction;
   a body assembly including a shaft and a shaft tube, the shaft including an inner bore configured to threadably receive the lead screw therein;
   a shaft slot extending axially along the shaft; and
   a shaft pin inserted at least partially through the shaft tube and received within the shaft slot to key the shaft to the shaft tube and prevent the shaft from rotating with the rotor,
   wherein an interaction between the shaft pin and the shaft slot axially overlaps with the lead screw, and wherein selective rotation of the rotor assembly is configured to displace the shaft between an extended position and a retracted position.

2. The linear actuator of claim 1, wherein the lead screw is rotationally coupled to the rotor via a screw pin that extends through the lead screw and into screw pin slots formed in the rotor.

3. The linear actuator of claim 2, wherein a snap ring is in engagement with the screw pin to prevent the lead screw from displacing axially relative to the rotor.

4. The linear actuator of claim 1, wherein the shaft slot extends radially into an outer surface of the shaft.

5. The linear actuator of claim 1, wherein the shaft includes a shaft nut pressed into an open end thereof.

6. The linear actuator of claim 5, wherein the shaft slot includes a stroke portion and a removal portion circumferentially offset from the stroke portion.

7. The linear actuator of claim 1, further comprising a position sensor configured to output a position of the shaft between the extended position and the retracted position.

8. The linear actuator of claim 7, wherein the position sensor is a Hall Effect sensor.

9. The linear actuator of claim 7, wherein the shaft includes a sensor slot that defines a varying protrusion depth into the shaft, and the position sensor includes a sensor pin in engagement with the sensor slot.

10. The linear actuator of claim 9, wherein when the shaft displaces between the extended position and the retracted position, the sensor pin is displaced to a unique position by the varying protrusion depth of the sensor slot.

11. The linear actuator of claim 7, wherein the position sensor includes a flexible PCB coil arranged between an outer surface of the shaft and a shaft tube inner bore of the shaft tube.

12. A linear actuator comprising:
   a rotor assembly including a rotor and a nut, wherein the nut is rotationally coupled to the rotor for rotation therewith;

a stator assembly configured to selectively rotate the rotor in a desired direction; and a body assembly including a shaft threadably coupled to the nut, wherein the shaft is keyed to an anti-rotation pin and prevented from rotating with the rotor, and wherein selective rotation of the rotor assembly is configured to displace the shaft between an extended position and a retracted position; and wherein the anti-rotation pin includes a slot extend axially therealong, and a slot pin extends through the slot and into engagement with the shaft to prevent rotation of the shaft with the rotor.

13. The linear actuator of claim 12, wherein the anti-rotation pin is keyed to a housing of the linear actuator.

14. The linear actuator of claim 12, wherein the shaft includes an inner bore to receive the anti-rotation pin therein such that the shaft and the anti-rotation pin are concentric.

15. The linear actuator of claim 12, wherein the shaft includes a slot pin extending therethrough to receive the slot in the anti-rotation pin, and wherein an interaction between the slot pin and the slot in the anti-rotation pin axially overlaps with the nut.

16. A linear actuator comprising:
a rotor assembly including a rotor and a nut, wherein the nut is rotationally coupled to the rotor for rotation therewith;

a stator assembly configured to selectively rotate the rotor in a desired direction; and a body assembly including a body configured to slidably receive a shaft threadably coupled to the nut, wherein the shaft is keyed to the body and prevented from rotating with the rotor, and wherein selective rotation of the rotor assembly is configured to displace the shaft between an extended position and a retracted position; and wherein the shaft is keyed to the body by flats extending axially along the shaft, the body including corresponding body flats configured to engage the flats along the shaft.

17. The linear actuator of claim 16, wherein the body includes keyed slots formed therein, and the shaft includes corresponding recessed slots configured to receive the keyed slots.

18. The linear actuator of claim 16, wherein the shaft further includes tabs extending radially outward from the shaft and configured to act as an axial stop when the shaft is in an extended position, the tabs being positioned between a threading on the shaft and the flats.

* * * * *